(12) United States Patent
Morgan (10) Patent No.: US 8,024,806 B2
(45) Date of Patent: Sep. 20, 2011

(54) METHOD, APPARATUS AND SYSTEM FOR ENABLING A SECURE LOCATION-AWARE PLATFORM

(75) Inventor: Dennis Morgan, Grove, CA (US)

(73) Assignee: Intel Corporation, Santa Clara, CA (US)

( * ) Notice: Subject to any disclaimer, the term of this patent is extended or adjusted under 35 U.S.C. 154(b) by 1234 days.

(21) Appl. No.: 11/583,394

(22) Filed: Oct. 17, 2006

(65) Prior Publication Data

US 2008/0092236 A1 Apr. 17, 2008

(51) Int. Cl.
*G06F 12/14* (2006.01)
(52) U.S. Cl. .......................................... 726/25; 713/153
(58) Field of Classification Search ...................... 726/25
See application file for complete search history.

(56) References Cited

U.S. PATENT DOCUMENTS

| | | | |
|---|---|---|---|
| 7,295,556 B2 * | 11/2007 | Roese et al. ................ | 370/395.3 |
| 2003/0204748 A1 * | 10/2003 | Chiu .............................. | 713/201 |
| 2004/0111578 A1 | 6/2004 | Goodman et al. | |
| 2005/0055578 A1 * | 3/2005 | Wright et al. ................. | 713/201 |
| 2005/0195778 A1 | 9/2005 | Bergs et al. | |
| 2005/0223220 A1 | 10/2005 | Campbell et al. | |
| 2006/0136910 A1 | 6/2006 | Brickell | |
| 2006/0136911 A1 | 6/2006 | Robinson et al. | |

FOREIGN PATENT DOCUMENTS

| | | |
|---|---|---|
| EP | 1898307 A1 | 3/2008 |
| JP | 2004-265286 | 9/2004 |
| JP | 2008243178 | 9/2008 |
| KR | 1020040104679 A | 10/2004 |
| KR | 10-2008-0034810 A | 4/2008 |
| WO | 03/094440 A1 | 11/2003 |

OTHER PUBLICATIONS

European Search Report (dated Mar. 20, 2008), Application No. 07254101.4-1244, Reference 4031330, Applicant, Intel Corporation (INTEL), 7 pages.
Alan D. Ross et al., "Operating-System Independent Digital Security Management", U.S. Appl. No. 11/271,292, filed Nov. 12, 2005.
Dennis M. Morgan et al., "Method and Apparatus for Securely Accessing Data ", U.S. Appl. No. 11/271,228, filed Nov. 12, 2005.
http://www.blackice.com/PCProtection-Firewall.htm, 2 pages.
Office Action received for Japanese Patent Application No. 2007-269352 mailed Jan. 18, 2011; 6 pages including 3 pages of English Translation.
Tasaka et al., "A Method for Seamless and Simultaneous Access to the Internet and Local Network Based on Mobile Router," Transactions of the 2006 IEICE General Conference, Engineering Science, p. 298, A-17-6, 2006, 3 pages.
Office Action received for European Patent Application No. 7253459.7, mailed on Jun. 19, 2009, 4 pages.
Office Action received for Korean Patent Application No. 10-2007-0104514, mailed on Jun. 23, 2009, 3 pages of Office Action and 3 pages of English Translation.

(Continued)

*Primary Examiner* — Matthew B Smithers
(74) *Attorney, Agent, or Firm* — Barnes & Thornburg LLP (57) ABSTRACT

A method, apparatus and system enable a secure location-aware platform. Specifically, embodiments of the present invention may utilize a secure processing partition on the platform to determine a location of the platform and dynamically apply and/or change security controls accordingly.

15 Claims, 6 Drawing Sheets

OTHER PUBLICATIONS

Chinese Office action received for Chinese patent application No. 200710306872.0 mailed on Jun. 12, 2010, 6 pages of office action and 6 pages of english translation.
European search report received for European Patent Application No. 07235459.7, mailed on Feb. 4, 2008, 8 pages.
Office Action received for Japanese Patent Application No. 2007-269352 mailed Sep. 21, 2010; 5 pages.
Machine Translation of the cited reference 1 (JP-A-2004-265286) (previously cited in IDS filed on Nov. 8, 2010).

* cited by examiner

METHOD, APPARATUS AND SYSTEM FOR ENABLING A SECURE LOCATION-AWARE PLATFORM

BACKGROUND

One of the major challenges for system administrators is the ability to implement controls that allow a user to make the most out of all functionality available on a computing platform (e.g., collaboration, connectivity, etc.) but still provide solid security controls to prevent the platform from compromise. More often than not, a configuration implemented for functionality within a corporate network may result in security vulnerabilities when the platform is outside the corporate network.

This issue is most evident in wireless networks, which are proliferating at a rapid pace today as computer users become increasingly mobile. These networks typically face significant security issues since the connection is not physical and any party with a compatible wireless network interface may position themselves to inspect and/or intercept wireless packets. In other words, any third party hacker or attacker may, with relative ease, gain access to packets being transmitted across a wireless network, regardless of who the packets are actually destined for. Various security controls may be implemented on these networks to alleviate this problem, but the ability to apply more stringent and better security controls based on the trustworthiness of the network is typically left to security vendors. Most vendors do not, however, provide configurable controls based on system location.

Figure 1:
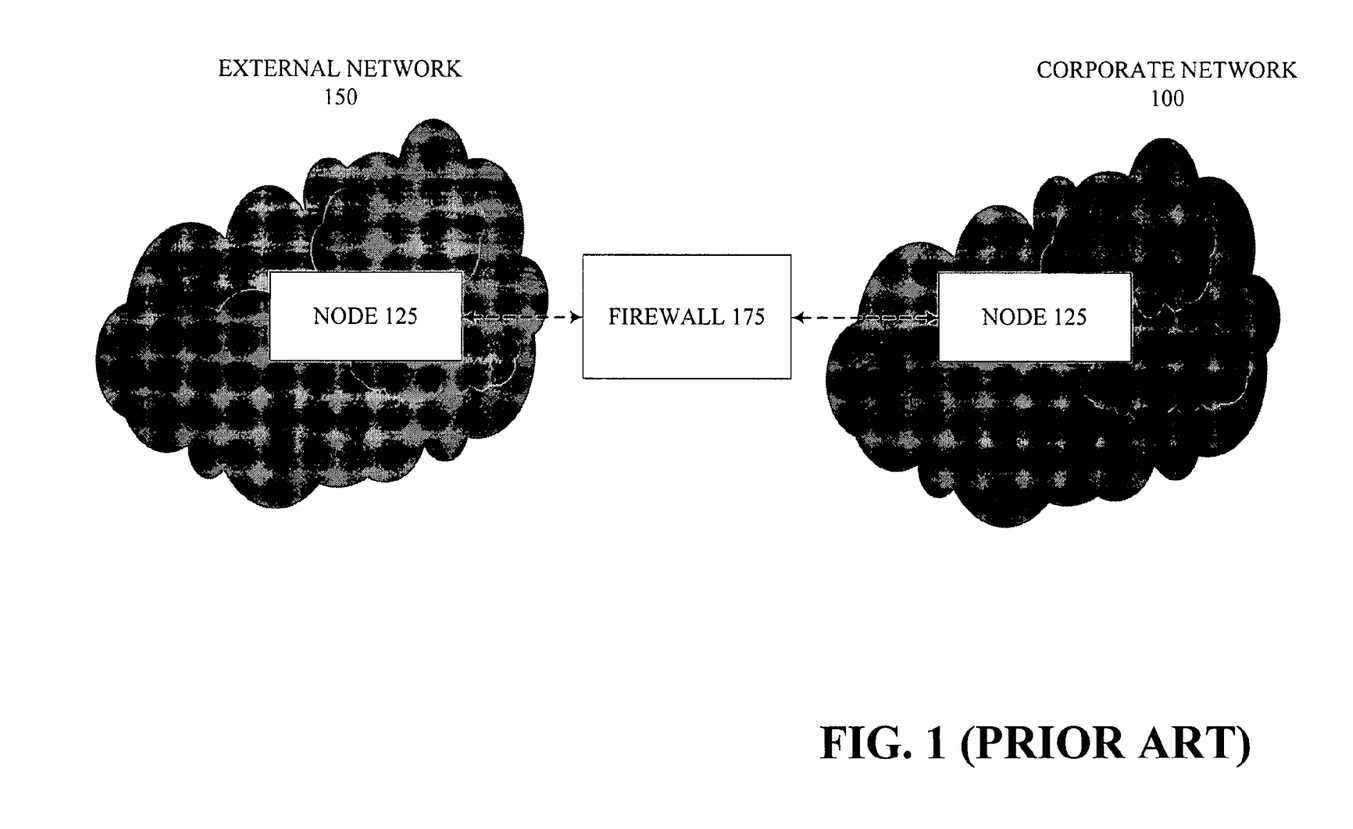
FIG. 1 illustrates a typical wireless network topology.

FIG. 1 illustrates conceptually a typical wireless network topology including a corporate network ("Corporate Network 100") and an external network ("External Network 150"), with a wireless device ("Node 125") traveling from one network to the other. Corporate Network 100 is typically separated from External Network 150 by a gateway or firewall or other such security mechanism (illustrated collectively in FIG. 1 as "Firewall 175"). When moving from one network to another, however, Node 125 will likely face different security issues but currently, Node 125 may not dynamically determine its location and change its security controls. Thus, although wireless networks offer users significant flexibility to "roam" across networks without being tied to a specific location, the wireless devices may or may not have adequate security control as they alternate between secure environments (e.g., within a corporation) and less or non-secure environments (e.g., outside the corporation).

Although the above description focuses on wireless devices, similar issues may arise with respect to non-wireless devices that may be moved from one location to another. For example, an owner of a laptop may be physically connected to a corporate network while he/she is in the office but at the end of the day, the owner may take the laptop home and connect it to his/her home office internet connection. In this scenario, the laptop may be moving from a secure (corporate) environment to a less secure (home) environment and the security requirements may be different in each environment.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments of the present invention provide a method, apparatus and system for enabling a secure location-aware platform. More specifically, embodiments of the present invention provide a secure environment within which a platform may automatically determine its location and dynamically adjust its security configuration. Embodiments of the invention may be implemented on any type of network (e.g., wired, Wi-Max, etc.) and/or any computing platform (wireless device, laptop, personal assistant, etc.) that is capable of being moved from one location to another. Thus, any reference herein to "device", "node" and/or "platform" shall include wired and/or wireless device running on any of the various types of networks described above. Additionally, reference in the specification to "one embodiment" or "an embodiment" of the present invention means that a particular feature, structure or characteristic described in connection with the embodiment is included in at least one embodiment of the present invention. Thus, the appearances of the phrases "in one embodiment," "according to one embodiment" or the like appearing in various places throughout the specification are not necessarily all referring to the same embodiment.

According to an embodiment of the present invention, an isolated and secure partition may be utilized to enhance security on a computing platform. Embodiments of the invention support a variety of secure partition types. The common thread amongst these partition types includes the ability to maintain a strict separation between partitions, either physically or virtually. Thus, for example, in one embodiment, the partitions may be implemented by embedded processors, e.g., Intel® Corporation's Active Management Technologies ("AMT"), "Manageability Engine" ("ME"), Platform Resource Layer ("PRL") and/or other comparable or similar technologies. In an alternate embodiment, the partitions may be virtualized, e.g., virtual machines (VM) in Intel® Corporation's Virtualization Technology ("VT") scheme, running on a Virtual Machine Monitor (VMM) on the platform. In yet another embodiment, on a multi-core platform such as Intel® Corporation's Core 2 Duo®, a partition may comprise one of the many cores that exist on the platform. In multi-core architectures such as the Core 2 Duo®, each core may have its independent address boundary and execution, and partition isolation may be provided by the platform hardware. It will be apparent to those of ordinary skill in the art that a virtualized host may also be used to interact with and/or leverage services provided by AMT, ME and PRL technologies.

Figure 2:
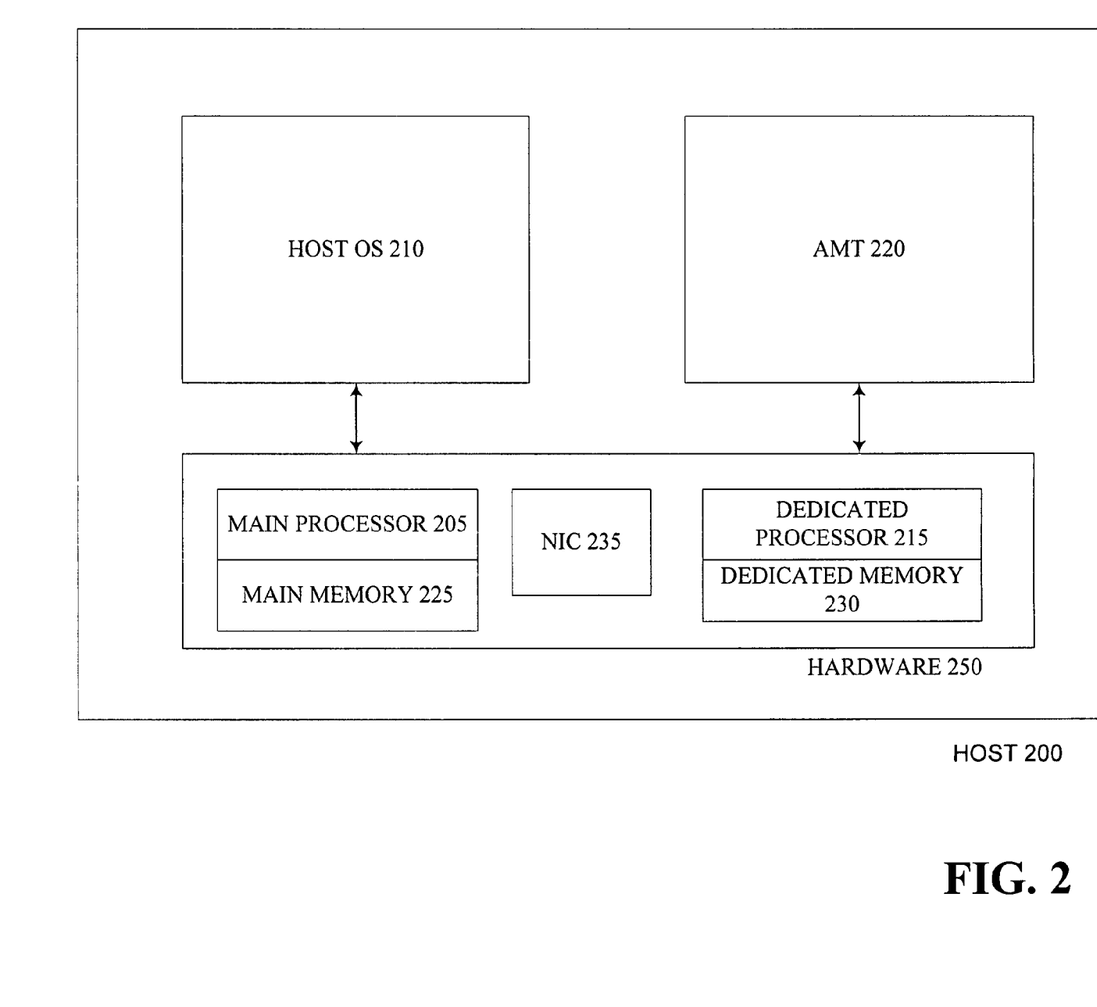
FIG. 2 illustrates an example AMT environment.

To facilitate understanding of embodiments of the present invention, the following paragraphs describe a typical AMT environment as well as a typical virtualized host. By way of example, FIG. 2 illustrates conceptually a typical Intel® AMT environment as implemented by Intel® Corporation. It will be readily apparent to those of ordinary skill in the art that embodiments of the present invention may also be implemented in other similar and/or comparable implementations of AMT. Only the components pertinent to describing the AMT environment have been illustrated in order not to unnecessarily obscure embodiments of the present invention, but it will be readily apparent to those of ordinary skill in the art that additional components may be included without departing from the spirit of embodiments of the invention.

Thus, as illustrated in FIG. 2, a device ("Host 200") may include a host operating system ("Host OS 210") and system hardware ("Hardware 250"). According to one embodiment, Hardware 250 may include one, two or more processors, one or more to perform typical processing tasks for Host OS 210 ("Main Processor 205") while the other may be dedicated exclusively to managing the device via a dedicated partition ("Dedicated Processor 215" for "AMT 220"). Each processor may have associated resources on Host 200 and they may share one or more other resources. Thus, as illustrated in this example, Main Processor 205 and Dedicated Processor 210 may each have portions of memory dedicated to them ("Main Memory 225" and "Dedicated Memory 230" respectively) but they may share a network interface card ("WNIC 235").

Figure 3:
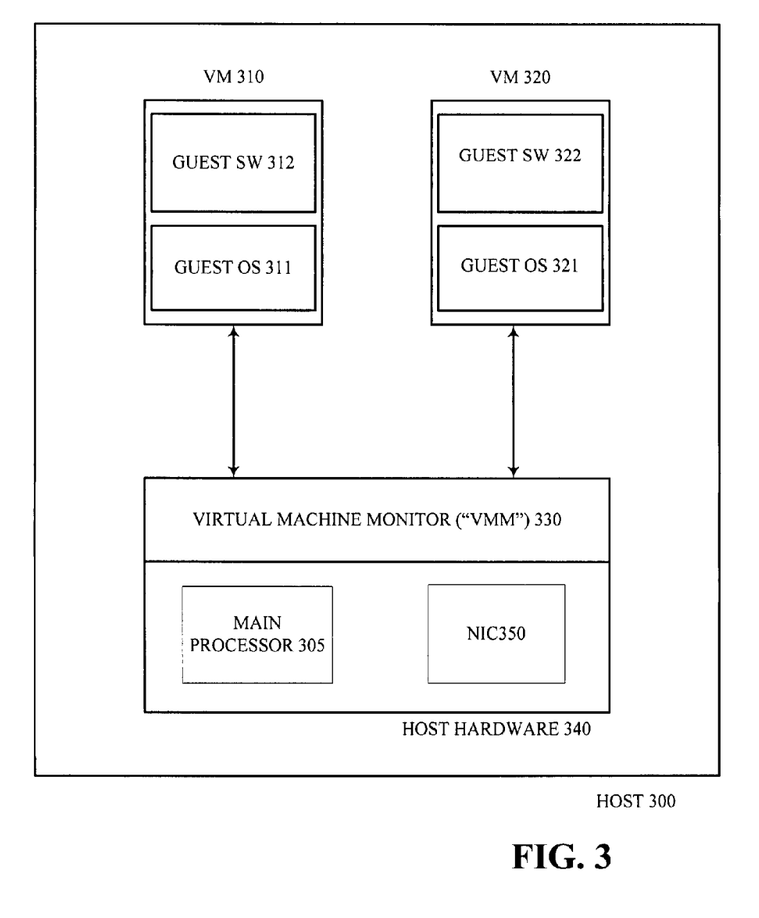
FIG. 3 illustrates an example virtual machine host.

Similarly, as illustrated in FIG. 3, if device ("Host 300") is virtualized, it may include only a single processor but a virtual machine monitor ("VMM 330") on the device may present multiple abstractions and/or views of the device or host, such that the underlying hardware of the host appears as one or more independently operating virtual machines ("VMs"). VMM 330 may be implemented in software (e.g., as a standalone program and/or a component of a host operating system), hardware, firmware and/or any combination thereof. VMM 330 manages allocation of resources on the host and performs context switching as necessary to cycle between various VMs according to a round-robin or other predetermined scheme. It will be readily apparent to those of ordinary skill in the art that although only one processor is illustrated ("Main Processor 305"), embodiments of the present invention are not so limited and multiple processors or processor cores may also be utilized within a virtualized environment.

Although only two VM partitions are illustrated ("VM 310" and "VM 320", hereafter referred to collectively as "VMs"), these VMs are merely illustrative and additional virtual machines may be added to the host. VM 310 and VM 320 may function as self-contained platforms respectively, running their own "guest operating systems" (i.e., operating systems hosted by VMM 330, illustrated as "Guest OS 311" and "Guest OS 321" and hereafter referred to collectively as "Guest OS") and other software (illustrated as "Guest Software 312" and "Guest Software 322" and hereafter referred to collectively as "Guest Software").

Each Guest OS and/or Guest Software operates as if it were running on a dedicated computer rather than a virtual machine. That is, each Guest OS and/or Guest Software may expect to control various events and have access to hardware resources on Host 100. Within each VM, the Guest OS and/or Guest Software may behave as if they were, in effect, running on Host 300's physical hardware ("Host Hardware 340", which may include a Network Interface Card ("WNIC 350")).

It will be readily apparent to those of ordinary skill in the art that an AMT, ME or PRL scheme may also be implemented within a virtualized environment. For example, VM 320 may be dedicated as an AMT partition on a host while VM 310 runs user applications on the host. In this scenario, the host may or may not include multiple processors. If the host does include two processors, for example, VM 320 may be assigned Dedicated Processor 215 while VM 310 (and other VMs on the host) may share the resources of Main Processor 205. On the other hand, if the host includes only a single processor, the processor may serve both the VMs, but VM 320 may still be isolated from the other VMs on the host with the cooperation of VMM 330. For the purposes of simplicity, embodiments of the invention are described in a virtualized AMT environment, but embodiments of the invention are not so limited. Instead, any reference to a "partition", a "secure partition", a "security partition" and/or a "management partition" shall include any physical and/or virtual partition (as described above).

Figure 4A:
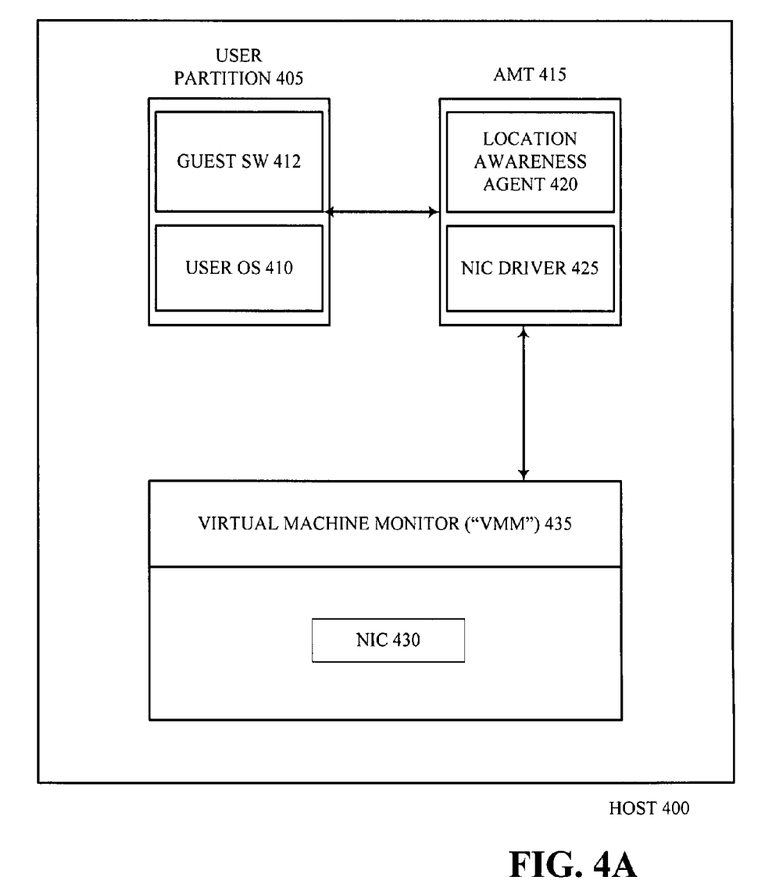
FIGS. 4A and 4B illustrate conceptually the components of an embodiment of the present invention.
Figure 4B:
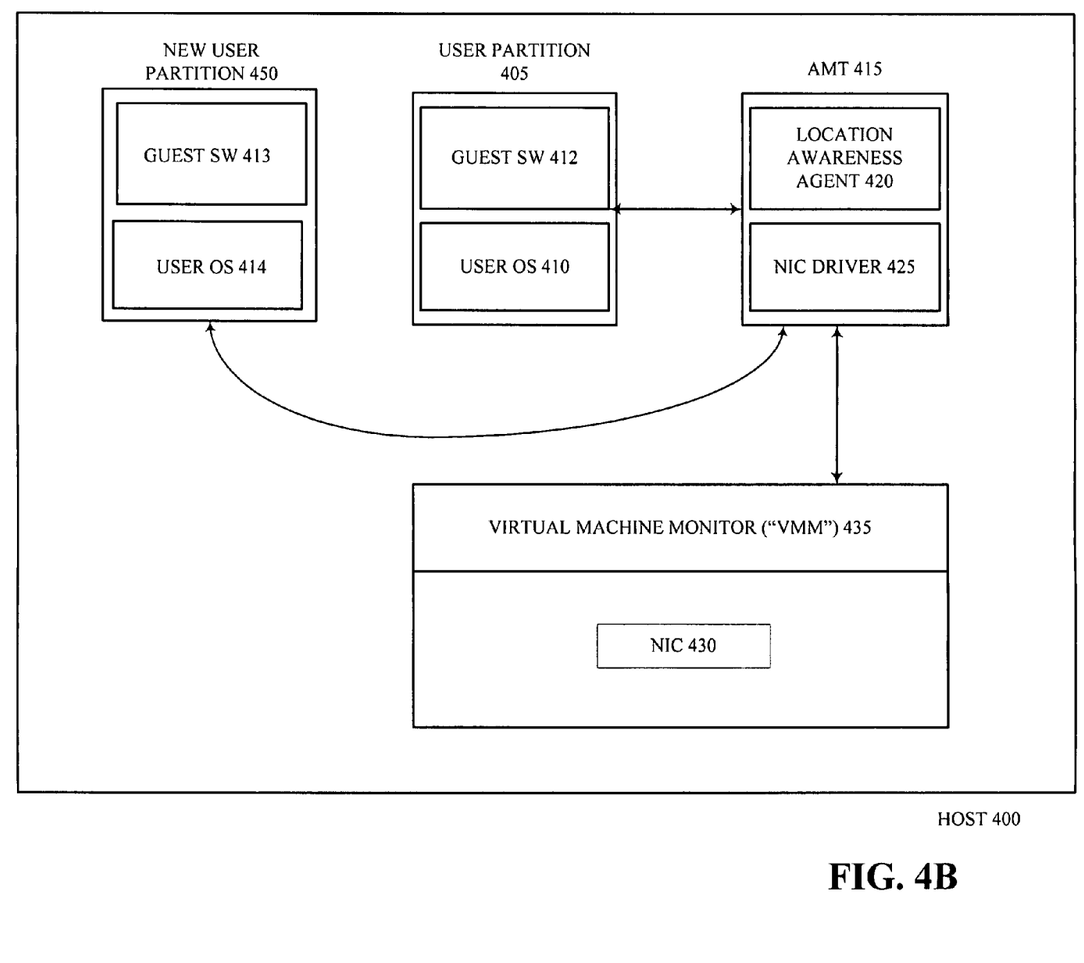

FIGS. 4A and 4B illustrate an embodiment of the present invention in a virtualized AMT environment. As illustrated, according to one embodiment of the present invention, a device ("Node 400") may include a user partition ("User Partition 405") having a user OS ("User OS 410"), a secure partition acting as an AMT ("AMT 415") and including a Location Awareness Agent ("LAA 420"), a virtual machine manager ("VMM 425") and local area network ("LAN") hardware/firmware ("NIC 430") having a driver residing within AMT 415 ("NIC Driver 425"). As previously stated, although the following description assumes an AMT, embodiments of the invention are not so limited. In one embodiment, AMT 415 may be isolated from User OS 410 (either via a physical separation, a virtual separation or a combination thereof) to enhance the security on the platform. Node 400 may reside within the typical topology described in FIG. 1 above, namely on Corporate Network 100 and/or External Network 150.

According to an embodiment of the present invention, LAA 420 may start up when Node 400 is powered on and normal AMT function begins. Once activated, LAA 420 may prevent User OS 410 from connecting to any network by preventing User OS 410 from accessing WNIC Driver 435. Instead, LAA 420 may first determine whether Node 400 is connected to a network and if it is, what type of network it is (e.g., internal or external). Thus, in one embodiment, if LAA 420 detects a network upon activation, LAA 420 may attempt to connect to infrastructure that only exists within a Corporate Network 100. It will be readily apparent to those of ordinary skill in the art that the selection of infrastructure to connect to may be configurable and may include elements such as a domain controller, an AMT management server and/or a corporate presence server. In alternate embodiments, LAA 420 may attempt to connect to any other infrastructure that is known to exist within Corporate Network 100 (e.g., within an Intel network, LAA 420 may be configured to look for an Intel-specific server at a specific network address).

If LAA 420 successfully detects an element on Corporate Network 100, it (in conjunction with VMM 425) may then enable User OS 405 to start up with a configurable set of security controls for a corporate (i.e., secure) environment. In one example, the security controls for a secure corporate environment may not include stringent firewall rules, file sharing rules, etc. This set of security controls may be tailored to a specific environment. For example, if LAA 420 detects network element A which indicates a highly secure network, it may select a particular set of security controls with minimal rules, while if it cannot find network element A and instead finds network element B, which is indicative of a less secure network, it may select a different set of security control. In other words, even within a corporate environment, a system administrator may elect to maintain multiple sets of configurable security controls, to enable the device to optimize its security scheme. Thus, embodiments of the present invention enable an administrator to fine tune the security schemes for devices according to the detected location.

In one embodiment, if LAA 420 detects a network but fails to connect to an element on Corporate Network 100, LAA 420 may determine that Node 400 is outside the corporate network, i.e. on External Network 150. LAA 420 may then enable User OS 405 to start up with a set of security controls configured for an unsecure environment. An example of such a set of security controls may include restrictions on firewall access and/or file sharing. In other words, if the device is at an unsecure location, the system administrator may elect to restrict the device user's ability to access data from within the corporation.

The embodiment above describes the situation where Node 400 starts up in a specific environment. In an alternate embodiment, Node 400 may startup in one environment and move to a different environment. LAA 420 may be configured to continuously monitor WNIC 435 for any changes to network status. If a change in status occurs, LAA 420 may repeat the process described above to determine whether a network still exists (i.e. whether the device is still connected to a network) and if so, whether it is within a corporate network or on an external network.

By way of example, if Node 400 starts up within Corporate Network 100 and travels to External Network 150, LAA 420 may detect the change in network status and repeat the network identification process above. In one embodiment, when LAA 420 determines that it is on External Network 150, it may start up a new partition ("New User Partition 450") with a set of security controls configured for an unsecure environment (as illustrated in FIG. 4B). LAA 420 and VMM 425 may then, transparent to the user, transfer the user's execution environment from User Partition 405 (governed by security controls for a secure partition) to New User Partition 450, running more stringent security controls. VMM 425 may then continue to maintain User Partition 405 or shut it down. In the event the system administrator is aware that a particular device roams frequently in between Corporate Network 100 and External Network 150, for example, the system administrator may configure VMM 425 to maintain User Partition 405 for future use when Node 400 travels back to Corporate Network 100 (described in further detail below).

In one embodiment, Node 400 may start up on External Network 150 and travel to Corporate Network 100, or, in the scenario described above, simply return back to Corporate Network 100. According to this embodiment, LAA 420 may once again detect a change in network status and repeat the network identification process described above. Upon detecting that Node 400 is once again running within a secure environment, LAA 420 and VMM 425 may start up a new partition with security controls for secure environments and move the user's execution environment to the new VM. Alternatively, if VMM 425 continued to maintain VM 405 as described above, VMM 425 may simply transfer the user's execution environment back to VM 405 (thus bypassing the startup costs associated with starting up a new partition).

According to an embodiment of the present invention, based on the location of Node 400, a system administrator may define varying levels of security for data access. Thus for example, if Node 400 is determined to be on Corporate Network 100, the user may be allowed unrestricted access to all data on the platform. If, however, Node 400 is determined to be on External Network 150, VMM 425 may allow access to specific types of data only via the partition that implements security controls for unsecure environments (e.g., New User Partition 445). In other words, if a user is within a secure environment, the user may access all data on the platform without limitations but if the user moves to an unsecure environment, embodiments of the present invention may utilize the secure location-awareness scheme described above to restrict data access.

By way of example, in the scenario described above where Node 400 moves from Corporate Network 100 to External Network 150, LAA 420 may detect the change in network status as previously described. According to one embodiment of the present invention, upon detecting that Node 400 is now running within an unsecure network and starting up a new partition with a different set of security controls, LAA 420 and VMM 425 may additionally restrict the data accessible by the new partition. Thus, New User Partition 450 described above may not only include a different set of security controls tailored for an unsecured environment, it may additionally include data restrictions to protect certain types of data on Node 400. It will be readily apparent to those of ordinary skill in the art that the data restrictions may be implemented in a variety of ways without departing from the spirit of embodiments of the present invention. In one embodiment, for example, LAA 420 and VMM 425 may simply maintain User Partition 405 with access to all data on Node 400 but disable network access to User Partition 405 while New User Partition 450 is running. Various embodiments of the invention may thus leverage the location awareness security scheme described above to restrict access to data based on the location of Node 400.

Although the above description assumes a virtualized platform, as previously discussed, embodiments of the invention support a variety of secure partition types. It will be readily apparent to those of ordinary skill in the art that features specific to each platform may be utilized to enhance embodiments of the invention. For example, on a multi-core platform such as Intel® Corporation's Core 2 Duo®, a partition may comprise one of the many cores that exist on the platform. According to this embodiment, one of the cores on the platform may be dedicated to running the location awareness agent, thus isolating the agent from the other partitions and/or applications running on the platform. In yet another embodiment, the location awareness agent may be implemented within a physical AMT partition on the platform. Regardless of the type of partition (physical or virtual), embodiments of the invention may utilize a location awareness agent capable of isolating the platform from a network and/or capable of implementing security controls for the platform to optimize platform security and performance.

Figure 5:
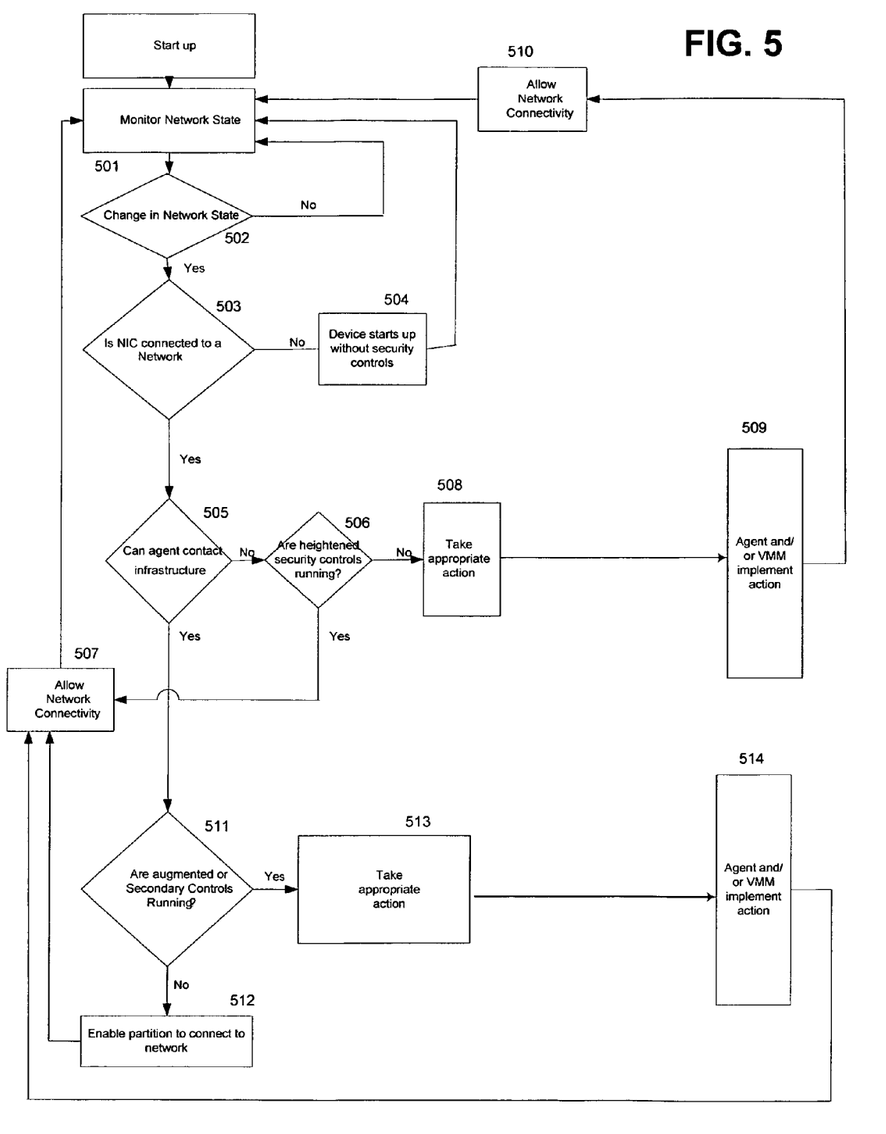
FIG. 5 is a flow chart illustrating an embodiment of the present invention.

FIG. 5 is a flow chart illustrating an embodiment of the present invention. Although the following operations may be described as a sequential process, many of the operations may in fact be performed in parallel and/or concurrently. In addition, the order of the operations may be re-arranged without departing from the spirit of embodiments of the invention. In 501, upon startup on a device, a location awareness agent may begin monitoring the network status of the device. If no change in network status is detected in 502, the location awareness agent may simply continue to monitor the network status of a device. If, however, a change in network status is detected in 502, the location awareness agent may determine in 503 whether the NIC on the device is connected to a network. If the NIC is not connected to a network, the location awareness agent may enable the operating system in a user partition on the device to start up in 504 without any security controls (because the lack of a network connection eliminates network security concerns). In this embodiment, the user may have access to all data on the device.

If, however, the NIC is connected to a network in 503, the location awareness agent may then attempt to contact various infrastructure elements within a corporate network in 505. If the location awareness agent is unable to connect to any corporate infrastructure element in 505, the location awareness agent may then in 506 examine the user partition to determine the type of security controls executing. If the security controls that are executing in the user partition are designed for a secure partition, then the location awareness agent may enable the user partition to connect to the network in 507. According to this embodiment, the location awareness agent may additionally impose restrictions to access on the data in the user partition by disabling or limiting network access to the data.

If, however, the security controls are tailored for an unsecure environment, the location awareness agent may in 508 determine an appropriate course of action. The location awareness agent may, for example, start a new partition having more stringent security controls and in 509, the agent and virtual machine manager may transfer the user's execution environment to the new partition. In one embodiment, the agent and virtual machine manager may also restrict access to the data in the user partition and make the data inaccessible by the new partition. Upon transfer into the new partition having heightened security controls, the location awareness agent may in 510 enable the new partition to connect to the network. It will be readily apparent to those of ordinary skill in the art that in alternate embodiments, the location awareness agent may implement various other courses of action without departing from the spirit of embodiments of the present invention.

If the location awareness agent is able to connect to one or more corporate infrastructure elements in 505, in 511, the agent determines whether the device is running heightened security controls. If it is not, the location awareness agent and virtual machine manager in 512 may enable the partition to connect to the network in 507. If, however, the device happens to be running heightened security controls, the location awareness agent may in 513 determine an appropriate course of action. Thus, for example, in one embodiment, the location awareness agent may shut down the partition having heightened security controls and in 514, transfer the user execution environment to a partition running less heightened security controls (since the heightened security controls are unnecessary for the device while running within the corporate network). Again, in one embodiment, the location awareness agent may impose restrictions on the data in the user partition.

In one embodiment, the partition running less heightened security controls may be the primary partition that the virtual machine manager continued to maintain when the device initially moved from the corporate network to an external network. In an alternate embodiment, the location awareness agent may start up a primary partition having less heightened security prior to transferring the user's execution environment. It will be readily apparent to those of ordinary skill in the art that the location awareness agent may take a variety of actions without departing from the spirit of embodiments of the present invention.

The computing platforms according to embodiments of the present invention may be implemented on a variety of computing devices. According to an embodiment, a computing device may include various other well-known components such as one or more processors. The processor(s) and machine-accessible media may be communicatively coupled using a bridge/memory controller, and the processor may be capable of executing instructions stored in the machine-accessible media. The bridge/memory controller may be coupled to a graphics controller, and the graphics controller may control the output of display data on a display device. The bridge/memory controller may be coupled to one or more buses. One or more of these elements may be integrated together with the processor on a single package or using multiple packages or dies. A host bus controller such as a Universal Serial Bus ("USB") host controller may be coupled to the bus(es) and a plurality of devices may be coupled to the USB. For example, user input devices such as a keyboard and mouse may be included in the computing device for providing input data. In alternate embodiments, the host bus controller may be compatible with various other interconnect standards including PCI, PCI Express, FireWire and other such existing and future standards.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
   identifying a change in network status of a device, the device including a secure partition and a user partition, the secure partition including a location awareness agent;
   the location awareness agent determining whether the device is connected to a network;
   if the device is connected to the network, the location awareness agent determining whether the network is secure;
   if the network is secure, the location awareness agent applying a first set of security controls to an operating system in the user partition prior to enabling the operating system to access the network; and
   if the network is unsecure, the location awareness agent applying a second set of security controls to the operating system in the user partition prior to enabling the operating system to access the network.

2. The method according to claim 1 wherein the first set of security controls is different than the second set of security controls and the second set of security controls imposes at least one more restriction than the first set of security controls.

3. The method according to claim 1 wherein determining whether the network is secure further comprises attempting to connect to known network infrastructure elements.

4. The method according to claim 1 wherein the first set of security controls enables the user partition to access data on the device and the second set of security controls restricts the user partition from accessing at least a portion of the data on the device.

5. The method according to claim 1 wherein the secure partition is at least one of an Active Management Technologies ("AMT"), a Manageability Engine" ("ME"), a Platform Resource Layer ("PRL"), a virtual machine ("VM") and an independent processor core.

6. The method according to claim 1 wherein the device is a wireless device.

7. A computing device, comprising:
   a network interface card;
   a user partition coupled to the network interface card;
   a secure partition coupled to the network interface card and the user partition, the secure partition managing access of the network interface card by the user partition;
   a location awareness agent coupled to the secure partition and the user partition, the location awareness agent capable of determining whether the computing device is connected to a network, if the computing device is connected to the network, the location awareness agent capable of determining whether the network is secure, if the network is secure, the location awareness agent capable of applying a first set of security controls to an operating system in the user partition prior to enabling the operating system to access the network and if the network is unsecure, the location awareness agent capable of applying second set security controls to the operating system in the user partition prior to enabling the operating system to access the network.

8. The computing device according to claim 7 further comprising a storage area coupled to the secure partition and the user partition, the storage area including data accessible by the secure partition and the user partition, the first set of security controls and the second set of security controls imposing restrictions on access to the data by the user partition, the second set of security controls imposing at least one more restriction on access than the first set of security controls.

9. The computing device according to claim 7 wherein the secure partition is at least one of an Active Management Technologies ("AMT") partition, a Manageability Engine" ("ME"), a Platform Resource Layer ("PRL"), a virtual machine ("VM") partition and an independent processor core.

10. An article comprising a non-transitory, machine-accessible medium having stored thereon instructions that, when executed by a machine, cause the machine to:
   identify a change in network status of a device, the device including a secure partition and a user partition;
   determine whether the device is connected to a network;
   if the device is connected to the network, determine whether the network is secure;
   if the network is secure, apply a first set of security controls to an operating system in the user partition prior to enabling the operating system to access the network; and
   if the network is unsecure, apply a second set security controls to the operating system in the user partition prior to enabling the operating system to access the network.

11. The article according to claim 10 wherein the first set of security controls is different than the second set of security controls and the second set of security controls imposes at least one more restriction than the first set of security controls.

12. The article according to claim 10 wherein the instructions, when executed by a machine, cause the machine to determine whether the network is secure by attempting to connect to known network infrastructure elements.

13. The article according to claim 10 wherein the first set of security controls enables the user partition to access data on the device and the second set of security controls restricts the user partition from accessing at least a portion of the data on the wireless device.

14. The article according to claim 10 wherein the device is a wireless device.

15. The method of claim 1, further comprising:
   determining a change in the status of the network from a secured network to an unsecured network; and
   creating a new partition in response to the change in the status of the network, the new partition having a third set of security controls.

* * * * *